(12) United States Patent
Startz

(10) Patent No.: US 8,973,487 B2
(45) Date of Patent: Mar. 10, 2015

(54) BEVERAGE MACHINE

(75) Inventor: Armin Startz, Weidenstetten (DE)

(73) Assignee: WMF Wuerttembergische Metallwarenfabrik AG, Geislingen/Steige (DE)

(*) Notice: Subject to any disclaimer, the term of this patent is extended or adjusted under 35 U.S.C. 154(b) by 299 days.

(21) Appl. No.: 13/476,324

(22) Filed: May 21, 2012

(65) Prior Publication Data

US 2012/0291634 A1    Nov. 22, 2012

(30) Foreign Application Priority Data

May 20, 2011 (DE) .......................... 10 2011 076 214

(51) Int. Cl.
*A47J 31/54* (2006.01)
*A47J 31/46* (2006.01)
*A47J 31/00* (2006.01)

(52) U.S. Cl.
CPC ................ *A47J 31/46* (2013.01); *A47J 31/002* (2013.01)
USPC ........................................................... 99/293

(58) Field of Classification Search
CPC ........... A47J 31/00; A47J 31/30; A47J 31/34; A47J 31/057; A47J 31/0573; A47J 31/40; A47J 31/46; A47J 31/54
USPC ....... 99/275, 279, 280, 290, 293, 300, 302 R, 99/323.3
See application file for complete search history.

(56) References Cited

U.S. PATENT DOCUMENTS

| | | | |
|---|---|---|---|
| 2004/0177760 A1* | 9/2004 | Eicher | 99/275 |
| 2008/0063772 A1 | 3/2008 | Kirschner et al. | |
| 2009/0151573 A1* | 6/2009 | Tonelli et al. | 99/280 |
| 2010/0266740 A1* | 10/2010 | Van Den Aker et al. | 426/433 |
| 2010/0300299 A1 | 12/2010 | Epars et al. | |
| 2011/0030564 A1 | 2/2011 | Cocco et al. | |

FOREIGN PATENT DOCUMENTS

| | | |
|---|---|---|
| DE | 691 22 012 | 2/2001 |
| DE | 20 2008 016 377 | 4/2009 |
| DE | 10 2008 021 777 | 11/2009 |
| DE | 20 2008 007 132 | 11/2009 |
| WO | 2011151703 A2 | 12/2011 |

* cited by examiner

*Primary Examiner* — Brian Jennison
(74) *Attorney, Agent, or Firm* — Gerald E. Hespos; Michael J. Porco; Matthew T. Hespos

(57) ABSTRACT

A beverage machine (1), in particular to a coffee machine, has a main flow path (3), that leads through a heating device (2), and a bypass flow path (4) that circumvents the heating device (2). The bypass flow path (4) branches off from the main flow path (3) upstream of the heating device (2). The main flow path (3) is connected to a water tank (5) at the input side and to a dispensing location (6) at the output side. A main flow pump (7) is arranged in the main flow path (3) between the water tank (5) and the heating device (2). Thus a bypass pump (8) is arranged in the bypass flow path (4) to provide a cost-efficient and accurate admixing of cold water.

10 Claims, 1 Drawing Sheet

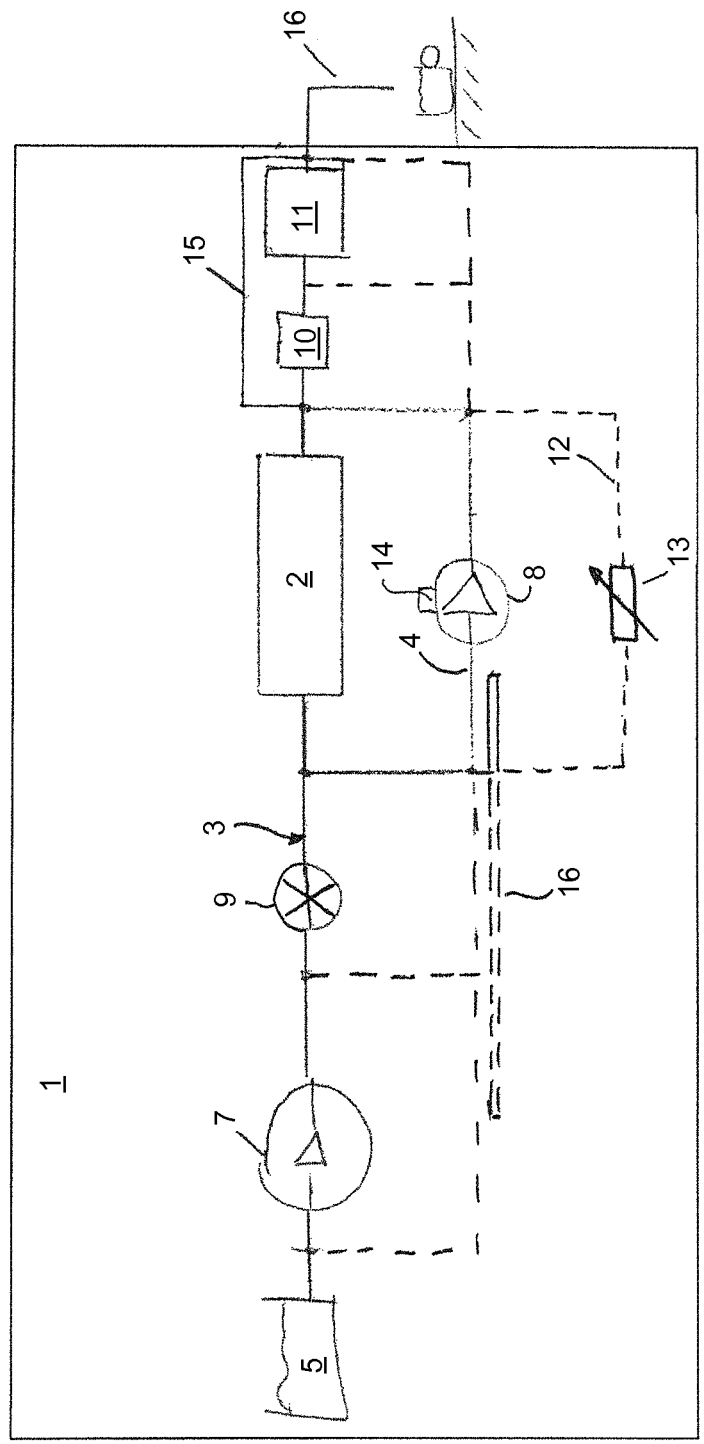

BEVERAGE MACHINE

BACKGROUND OF THE INVENTION

1. Field of the Invention

The instant invention relates to a beverage machine, in particular to a fully automatic coffee machine, comprising a main flow path that leads through a heating device, and a bypass flow path that circumvents the heating device.

2. Description of the Related Art

In beverage machines, the necessary brewing water, tea or also mixed infusion beverages are heated in heating devices, which are mostly set to a certain temperature. This temperature is set, e.g., in a boiler system as setpoint temperature or is predetermines by the system (e.g. water in a continuous-flow water heater system within a steam boiler). To be able to guarantee a consistently high quality of the beverage, it should be possible to individually dispense the optimum brewing water temperature for the beverage, for the purpose of which there are on principle three known possibilities. The first possibility is to heat the brewing water to the lowest required temperature and then to raise the system temperature briefly, based on the beverage, or to raise the beverage to the setpoint temperature by means of a downstream "booster" (small continuous-flow water heater). A second possibility is to provide the brewing water at a higher or at the highest necessary brewing temperature level in the heater system and then to set the desired brewing temperature by adding cold water. The third possibility is to heat the entire heater system very quickly based on the product. This, however, only seems sensible in the case of comparatively small dispensing quantities. Typically, the second possibility is used, that is, cold water is supplied to the actual heater system and the temperature is regulated through this. Either a cover or a magnetic valve is arranged in a bypass to release the bypass as needed and to allow cool water to flow to the beverage outlet around the heating device. The disadvantage of the mentioned systems is that it is not accurately known, which flow is set via the main path (heating device) and the bypass (cover/valve), because the pressure difference in both paths is approximately the same. In addition to the actual cross section of the two paths, the flow that occurs is a function of the flow speed, the hydrodynamics of the entire system as well as the viscosity of the medium. The occurring flow speed, in turn, varies highly as a function of the brewing device, which is connected downstream, or as a function of in which phase of preparation the system currently is (brewing start, preinfusion, brewing end, . . . ). The flow speed obviously also changes in the respective path, provided that it is turned off completely, for example by means of a valve. Unknown and uncontrollable impacts to the hydrodynamics also hold great uncertainties in terms of a mixing temperature that is to be set.

The instant invention deals with the problem of specifying an improved or at least an alternative embodiment for a beverage machine of the generic type that is characterized by a simple design solution, and that additionally provides reliable setting of an accurate mixing temperature.

SUMMARY OF THE INVENTION

The invention is based on arranging a bypass flow pump in the bypass flow path of a beverage machine comprising a main flow path and a bypass flow path, and to accurately meter an admixing quantity of cold water via the bypass flow pump. The main flow path thereby leads via a heating device, for example a continuous-flow water heater, whereas the bypass flow path circumvents this heating device, in that it branches off from the main flow path upstream of the heating device.

On the input side, the main flow path is thereby connected to a water tank or to a connection to a water supply from a line network and to a dispensing location at the output side. A main flow pump is arranged in the main flow path between the water tank/line network and the heating device. The invention thus provides a pump, here a bypass flow pump convey colder admixing water from the water tank/line network. The pump is in the main flow path instead of the cover, which was possible at that location until now, or instead of the valve, respectively, which was possible at that location until now. The bypass flow pump can be controlled as a function of the chosen product, of the occurring flow or the temperature at the input of the main flow path or at the dispensing location, respectively. In the event that the bypass flow pump is not actuated, all of the water reaches across the main flow path. It is also possible to set a certain basic bypass flow via a bypass that circumvents the bypass flow pump and in which a throttle device, in particular a cover, is arranged, for example. A significant advantage of the invention is that an admixing water quantity can be controlled accurately by means of the low pressure difference between main and bypass flow path in response to a known pump characteristic, in particular when using a gear-type pump or a magnetic piston pump. By means of the active reaction of the bypass flow pump, a defined rate of flow can additionally be established quickly, whereby individual mixing temperatures can be specifically generated at the dispensing location/mixing area by correspondingly changing the capacity of the bypass flow pump. On principle, such a bypass flow pump can also be produced in a more cost-efficient manner than a 2/2-way magnetic valve, for example, so that the solution according to the invention is also economical.

The bypass flow pump may be a vane-type pump, a gear-type pump or a magnetic piston pump. Magnetic piston pumps represent a very simple, yet extremely reliable design of a membrane pump. A coil, to which AC voltage is applied and the magnetic field of which acts on a lever, which is mounted so as to oscillate, namely the anchor, serves as actuator. The end of the lever acts on a membrane. The magnetic piston pump typically operates with the frequency of the AC voltage, with which it is actuated. Such a magnetic piston pump reaches a particularly good efficiency when the natural frequency of the anchor is adjusted to the AC voltage frequency, so that the bypass flow pump or the magnetic piston pump, respectively, operate in resonance. Due to the parts that move little, such magnetic piston pumps can reach long running lives and can, at the same time, operate extremely quietly, which is advantageous in particular for modern beverage machines.

Further important features and advantages of the invention follow from the subclaims, from the drawing and from the corresponding description of the figures by means of the drawing.

It goes without saying that the above-mentioned features and the features, which will be defined below, cannot only be used in the respective specified combination, but also in other combinations or alone, without leaving the scope of the instant invention.

A preferred exemplary embodiment of the invention is illustrated in the drawing and will be defined in more detail in the following description.

BRIEF DESCRIPTION OF THE DRAWING

FIG. 1 is an embodiment of a beverage machine according to the invention.

DETAILED DESCRIPTION OF THE PREFERRED EMBODIMENT

According to FIG. 1, a beverage machine 1 according to the invention, which can be embodied as a coffee machine, for example, encompasses a main flow path 3, which leads through a heating device 2, as well as a bypass flow path 4, which circumvents the heating device 2. The bypass flow path 4 thereby branches off from the main flow path 3 upstream of the heating device 2, whereby the main flow path 3 in turn is connected to a water tank 5/line network on the input side and to a dispensing location 6 on the output side. In the main flow path 3, a main flow pump 7 is thereby arranged between the water tank 5 and the heating device 2. According to the invention, a bypass flow pump 8 is now arranged in the bypass flow path 4, namely instead of a valve, which was often arranged at that location until now, or a cover, which was arranged at that location until now.

In the main flow path 3, a fluid flow meter 9 is arranged downstream from the main flow pump 7 and a brewing valve 10 as well as a brewing device 11 are arranged downstream from the heating device 2. It is thereby possible that the bypass flow path 4 branches off from the main flow path 3 between the water tank 5 and the main flow pump 7 or that the bypass flow path 4 branches off from the main flow path 3 between the main flow pump 7 and the fluid flow meters 9 or that the bypass flow path 4 branches off from the main flow path 3 between the fluid flow meter 9 and the heating device 3.

A return of the bypass flow path 4 into the main flow path 3 thereby preferably takes place either between the heating device 2 and the brewing valve 10 or downstream from the brewing device 11, whereby alternative positions for a branching off from the main flow path 3 as well for a return into the main flow path 3 are illustrated by means of a broken line.

Provision can optionally furthermore be made for a bypass 12, which circumvents the heating device 2 and the bypass flow pump 8 and in which a throttle device 13, in particular a cover, is arranged.

Generally, the bypass flow pump 8 and/or the main flow pump 7 can be embodied as vane-type pump, as gear-type pump or as magnetic piston pump, whereby in particular the latter alternative represents a cost-efficient and at the same time an accurately controllable pump. The heating device 2 can be embodied as a common continuous-flow water heater, for example.

Provision can furthermore be made for a control device 14, which controls/regulates the bypass flow pump 8 as a function of a flow volume, a beverage temperature at the dispensing location 6 or a water temperature in the water tank 5.

Due to the low pressure difference in the main flow path 3 and in the bypass flow path 4, the admixing water quantity can be controlled in a highly accurate manner in the case of known pump characteristics, in particular with the use of a gear-type pump or of a magnetic piston pump. By means of the active reactions of the bypass flow pump 8, a defined rate of flow can furthermore be established quickly. The mixing portion and thus the admixing quantity of the bypass flow pump 8 can be controlled accurately if the total rate of flow is known, which can be determined via the fluid flow meter 9, for example. By changing the capacity at the bypass flow pump 8 or by pulsing this bypass flow pump 8, different mixing temperatures can furthermore be generated specifically and a sensor element (not illustrated), for example, which is connected downstream, can be regulated through this.

It is furthermore possible to preheat the bypass flow path 4 and to thus generate pause compensations, e.g., and/or to keep a descaling liquid in motion in the heating device 2 by means of the bypass flow pump 8 and to thus improve a descaling result, in particular provided that the brewing valve 10 is not actuated thereby. Provision can be made, for example, for a further heating device 16 for heating the bypass flow path 4 at least area by area.

To simplify the actuation, the bypass flow pump 8 can, under the pressure conditions at hand, convey exactly the quantity or a slightly higher quantity of bypass water, which is necessary to obtain the lowest required mixing temperature. If a cool beverage is desired, the bypass flow pump 8 can thus be actuated permanently. However, it is also possible to admix the admixing water directly in the area of the dispensing location 6 via the bypass flow pump 8 only after the actual brewing process in a postmix, which is illustrated by means of a broken line according to FIG. 1.

In the case of the alternative embodiment shown according to FIG. 1, the pressure difference between the bypass flow path 4 and the main flow path 3 as well as the pressure difference upstream of and downstream from the heating device 2 is comparatively low, which is why the bypass flow pump 4 can generally operate with very low pressure/low pressure increase. In the event that the bypass flow pump 4 is furthermore manufactured as a gear-type pump or as a vane-type pump or as a magnetic piston pump, a cost-efficient manufacture can furthermore be obtained as compared to magnetic valves, which have been used there until now. A defined rate of flow can furthermore be generated via the bypass flow path 4 by means of any embodiments of the bypass flow pump 8, even when a simultaneous main flow is present at the same time in the main flow path 3.

A provision of tea water is generally also possible, whereby a path 15 is then chosen, which circumvents the brewing device 11 and the brewing valve 10 and which leads directly from the heating device 2 to the mixing location/beverage dispensing location 6.

In the event that the bypass flow pump 4 is not actuated, a certain basic bypass path can circumvent the heating device 2 via the throttle device 13, whereby it goes without saying that it is also possible that the entire flow-through takes place via the main flow path 3 when the bypass flow pump 4 is not actuated and the throttle device 13 is closed. Likewise, it is also possible that an embodiment of cold brewing is possible when the bypass flow pump 8 operates by itself, that is, without main flow pump 7 and without conveying water through the heating device.

What is claimed is:

1. A beverage machine, comprising:
   a main flow path having an input end connected to a water supply and an output end connected to a dispensing location, a heating device disposed along the main flow path between the input end and the output end and a main flow pump arranged between the input end and heating device;
   a bypass flow path branching from the main flow path upstream of the heating device, and a bypass pump arranged in the bypass flow path; and
   a control device that controls the bypass flow pump as a function of a beverage temperature at the dispensing location and at least one of a flow volume, and a water temperature in the water supply.

2. The beverage machine of claim 1, further comprising a fluid flow meter is arranged in the main flow path downstream from or upstream of the main flow pump and a brewing valve and a brewing device are arranged downstream from the heating device.

3. The beverage machine of claim 2, wherein the bypass flow path branches off from the main flow path between the water supply and the main flow pump, or the bypass flow path branches off from the main flow path between the main flow pump and the fluid flow meter, or the bypass flow path branches off from the main flow path between the fluid flow meter and the heating device.

4. The beverage machine according to claim 2, wherein that the bypass flow path returns back into the main flow path between the heating device and the brewing valve, or that the bypass flow path returns back into the main flow path downstream from the brewing valve.

5. The beverage machine of claim 2, further comprising: a bypass that circumvents the heating device and the bypass flow pump and a throttle device being in the bypass.

6. The beverage machine of claim 1, wherein at least one of the bypass flow pump and the main flow pump is embodied as a vane-type pump, as a gear-type pump or as a magnetic piston pump.

7. The beverage machine of claim 1, wherein the heating device is a continuous-flow water heater or a boiler.

8. The beverage machine of claim 1, further comprising a further heating device, by means of which the bypass flow path can be heated at least area by area.

9. The beverage machine of claim 1, wherein the water supply is a water tank.

10. The beverage machine of claim 1, wherein the water supply is a line network.

* * * * *